United States Patent
Kong

(10) Patent No.: US 7,478,832 B2
(45) Date of Patent: Jan. 20, 2009

(54) KNEE BOLSTER BRACKET STRUCTURE OF VEHICLE

(75) Inventor: Byung Seok Kong, Gunpo-si (KR)

(73) Assignee: Hyundai Motor Company, Seoul (KR)

( * ) Notice: Subject to any disclaimer, the term of this patent is extended or adjusted under 35 U.S.C. 154(b) by 422 days.

(21) Appl. No.: 11/185,363

(22) Filed: Jul. 20, 2005

(65) Prior Publication Data

US 2006/0061199 A1 Mar. 23, 2006

(30) Foreign Application Priority Data

Jul. 20, 2004 (KR) ...................... 10-2004-0056362

(51) Int. Cl.
*B60R 21/02* (2006.01)

(52) U.S. Cl. .................... 280/748; 297/423.1

(58) Field of Classification Search ............ 297/423.11, 297/423.1, 216.1; 280/752, 751, 748; 296/35.2
See application file for complete search history.

(56) References Cited

U.S. PATENT DOCUMENTS

| | | | | |
|---|---|---|---|---|
| 4,709,943 A | * | 12/1987 | Yoshimura et al. | .......... 280/751 |
| 5,037,130 A | * | 8/1991 | Okuyama | .................... 280/752 |
| 6,176,544 B1 | * | 1/2001 | Seksaria et al. | ........ 296/203.02 |
| 6,299,208 B1 | * | 10/2001 | Kasahara et al. | ............ 280/752 |
| 7,185,917 B2 | * | 3/2007 | Nagata et al. | ................ 280/748 |
| 2003/0025314 A1 | * | 2/2003 | Figlioli et al. | ................ 280/752 |
| 2003/0173763 A1 | * | 9/2003 | Yamazaki et al. | ............ 280/748 |
| 2004/0070188 A1 | * | 4/2004 | Chickmenahalli et al. | ... 280/752 |
| 2005/0067824 A1 | * | 3/2005 | Kim | ............................ 280/752 |

* cited by examiner

*Primary Examiner*—Milton Nelson, Jr.
(74) *Attorney, Agent, or Firm*—Morgan, Lewis & Bockius LLP

(57) ABSTRACT

A knee bolster structure of a vehicle, capable of effectively protecting knees of a driver in an accident, has two bracket members triangular shapes a lower end of the first knee bolster bracket configured to move coupled to the member is coupled to the cowl cross bar and the lower end of the second knee bolster bracket member is coupled to the center support bracket, which connected to the cowl cross bar so that the second knee bolster bracket is prevented from interfering with the key set. The knee bolster structure has upper and lower knee contact portions formed at front parts of the first and second knee bolster bracket members, so the knee bolster structure is used corresponding to position variation of knees of the driver.

5 Claims, 6 Drawing Sheets

KNEE BOLSTER BRACKET STRUCTURE OF VEHICLE

CROSS-REFERENCE TO RELATED APPLICATION

This application claims priority to and the benefit of Korean Patent Application 10-2004-0056362 filed in the Korean Intellectual Property Office on Jul. 20, 2004, the entire content of which is incorporated herein by reference.

BACKGROUND OF THE INVENTION (a) Field of the Invention

The present invention relates to a knee bolster structure of a vehicle. More particularly, the present invention relates to a knee bolster structure of a vehicle, capable of effectively protecting knees of a driver when a vehicular accident occurs.

(b) Description of the Prior Art

When a vehicular accident occurs, occupants in the driver's seat and front passenger's seat may be moved forwards and collide with the lower panel installed at an inner front portion of the vehicle. If the lower panel is easily deformed, knees of the driver and passenger may further move forwards while deforming the lower panel so that heads and chests of the driver and passenger are pulled back. In this case, the airbag does not effectively protect the driver and passenger. In order to prevent the above problem, a knee bolster is installed at an inner portion of the lower panel in front of the driver's seat in order to prevent knees of the driver from excessively moving beyond the lower panel when a vehicular accident occurs. Such a knee bolster may absorb impact when the knees of the passenger collide with a key set.

However, with the conventional knee bolster structure, when the steering wheel column is compressed due to a vehicular accident, the key set may interfere with a bracket aligned at one side of the key set, so the steering wheel column cannot be easily compressed, thereby causing damage to the chest of the passenger. In addition, a left lower end portion of the driver's seat may not be covered with the conventional knee bolster structure. In this case, a knee (left knee) of the driver may deviate from the knee bolster bracket when oblique collision occurs.

In addition, the conventional knee bolster bracket is vertically coupled to the cowl cross bar, so the conventional knee bolster bracket cannot simultaneously support the knees of a 50% male dummy (knee spacing: 270 mm) and a 5% female dummy (knee spacing: 150 mm), which are used for a vehicle crash test. When the vehicular accident occurs, the knees of the passenger may move in the same direction as an impact energy absorption direction of the knee bolster bracket, so the knees of the passenger may be subject to serious damage.

SUMMARY OF THE INVENTION

Embodiments of the present invention provide a knee bolster structure of a vehicle, in which knee bolster bracket members are slantingly coupled to a cowl cross bar and a center support bracket so that the knee bolster bracket members are slantingly bent when a vehicular accident occurs while absorbing impact energy and continuously supporting knees of a driver or a passenger, thereby preventing the knees of the driver or the passenger from being seriously damaged.

Embodiments of the present invention also provide a knee bolster structure of a vehicle, in which knee bolster bracket members is coupled to a cowl cross bar and a center support bracket, respectively, in such a manner that a steering wheel column positioned between a fuse box installed at an inner potion of a lower panel and the knee bolster member may not interfere with a key set, thereby preventing knees of a driver from being seriously damaged when a vehicular accident occurs.

In an exemplary embodiment of the present invention, a knee bolster structure comprises a first knee bolster bracket member installed at an inner portion of a lower panel provided at a front lower portion of a driver in order to absorb impact applied thereto from knees of the driver and positioned at a side of a fuse box, and a second knee bolster bracket member positioned adjacent to a key set integrally formed with a steering wheel column of the vehicle. The first knee bolster bracket member has a substantially triangular plate shape including a vertex portion coupled to a cowl cross bar of the vehicle and two lateral parts extending towards the knee of the driver by a predetermined length. Upper and lower knee contact potions are formed at front end portions of the two lateral parts while being spaced from each other in a longitudinal direction by a predetermined distance, and the second knee bolster bracket member includes a lower end portion coupled to a center support bracket connected to the cowl cross bar. Two lateral parts extend towards the knee of the driver by a predetermined length, upper and lower knee contact potions being formed at front end portions of the two lateral parts while being spaced from each other in a longitudinal direction by a predetermined distance.

Thus, the knee bolster bracket member is prevented from interfering with the key set. In addition, the knee bolster bracket member is bent while continuously supporting the knees of the driver and absorbing impact energy applied thereto, thereby preventing the knees of the driver from being seriously damaged.

According to another exemplary embodiment of the present invention, the first and second knee bolster bracket members are inclined in a predetermined direction by a predetermined angle with respect to a vertical plane of the cowl cross bar.

Predetermined front parts of the upper knee contact portion and the lower knee contact portion of the first knee bolster bracket member coupled to the cowl cross bar or the second knee bolster bracket member are bent in opposition to each other in order to reinforce strength thereof.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENTS

Hereinafter, a knee bolster structure of a vehicle according to a preferred embodiment of the present invention will be described with reference to the accompanying drawings.

Figure 1A:
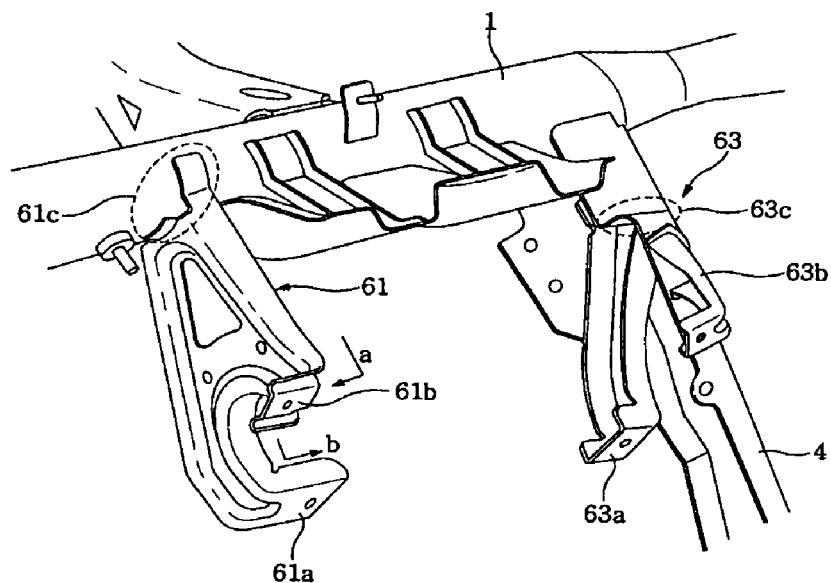
FIGS. 1a to 1d are perspective views illustrating knee bolster bracket structures installed in a vehicle according to one embodiment of the present invention.

Referring to FIG. 1a, the knee bolster bracket structure according to the present invention includes first and second knee bolster bracket members 61 and 63 for absorbing impact applied to knees of a driver. One of the first and second knee bolster bracket members 61 and 63 is welded to a cowl cross bar 1 of a vehicle chassis and the other is welded to a center support bracket 4 connected to the cowl cross bar 1.

The first knee bolster bracket member 61 has a substantially triangular plate shape, in which a vertex portion 61c thereof is coupled to the cowl cross bar 1. In addition, end portions 61a and 61b of two lateral parts extending from the vertex portion 61c are spaced from each other in a longitudinal direction by a predetermined distance in such a manner that a knee (left knee) of the driver makes contact the end portions 61a and 61b of the two lateral parts. For facilitating explanation, the end portion 61b positioned above the end portion 61a is called an "upper knee contact portion" and the end portion 61a positioned below the end portion 61b is called a "lower knee contact portion".

When the lower end of the first knee bolster bracket member 61 is welded to the cowl cross bar 1, the first knee bolster bracket member 61 is inclined in a predetermined direction (for example, a left direction). In addition, predetermined portions of the upper knee contact portion 61b and the lower knee contact portion 61a, which correspond to front ends of the two lateral parts, are bent in opposition to each other in order to reinforce strength thereof. That is, as shown in FIG. 1a, the upper knee contact portion 61b is bent in a left direction as shown in an arrow (a) and the lower knee contact portion 61a is bent in a right left direction as shown in an arrow (b). However, the bending directions of the upper knee contact portion 61b and the lower knee contact portion 61a can be interchanged with each other.

A lower end of the second knee bolster bracket member 63 is welded to the center support bracket 4, which is vertically connected to the cowl cross bar 1. The second knee bolster bracket member 63 has a triangular shape, in which a vertex portion 63c thereof is coupled to the center support bracket 4 and two lateral parts extend from the vertex portion 63c by predetermined lengths.

Similarly to the first knee bolster bracket member 61, when the second knee bolster bracket member 63 is welded to the center support bracket 4, the second knee bolster bracket member 63 is inclined in a predetermined direction (for example, a left direction).

End portions 63a and 63b of two lateral parts extending from the vertex portion 63c are spaced from each other in a length direction thereof by a predetermined distance and predetermined portions of the two lateral parts in opposition to each other in order to reinforce strength thereof. In addition, a knee (right knee) of the driver makes contact with the end portions 63a and 63b of two lateral parts.

A lower panel (see, 51 in FIG. 1b) is coupled to front portions of the upper and lower knee contact portions 61a, 61b, 63a and 63b of the first and second knee bolster bracket members 61 and 63.

Figure 1B:
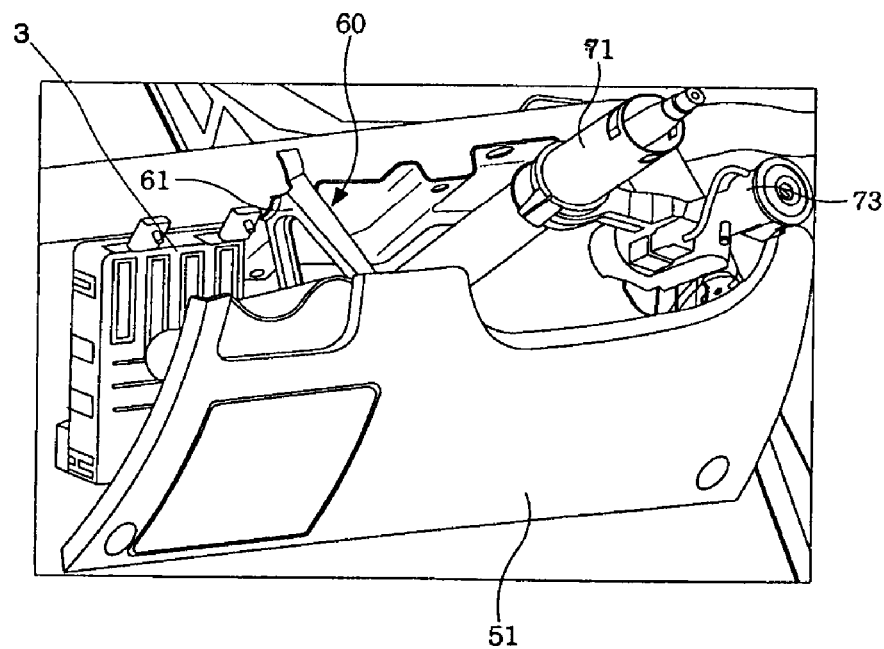

FIG. 1b shows peripheral elements of the knee bolster bracket structure 60 according to one embodiment of the present invention. As shown in FIG. 1b, the lower panel 51 positioned in front of the knees of the driver is coupled to a front portion of the knee bolster bracket structure 60. In addition, a steering wheel column 71 is positioned in a space section formed between the first knee bolster bracket member 61 and the second knee bolster bracket member 63 and a key set 73 is integrally formed with the steering wheel column 71.

Figure 1C:
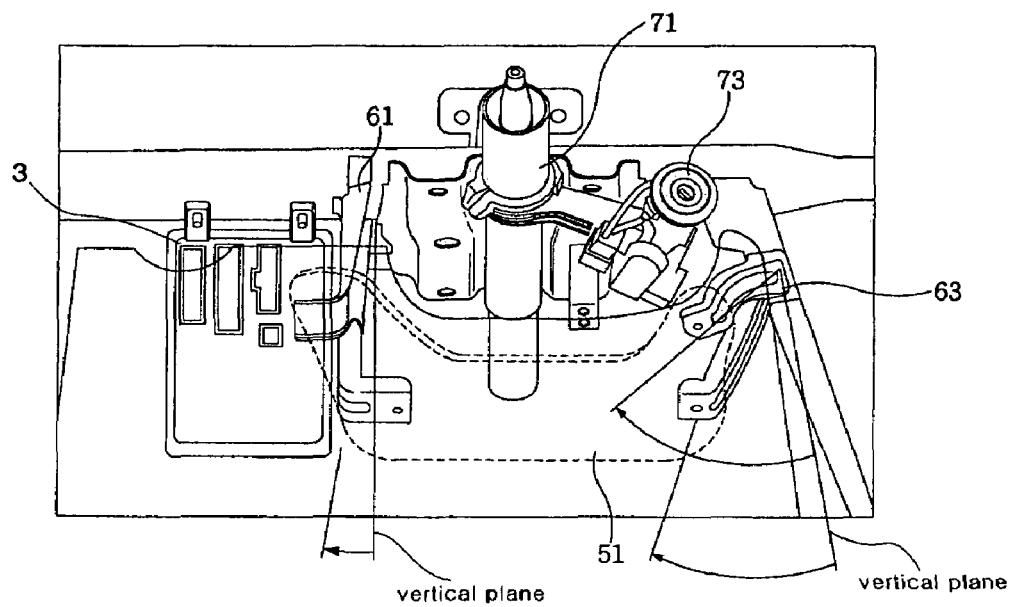
Figure 1D:
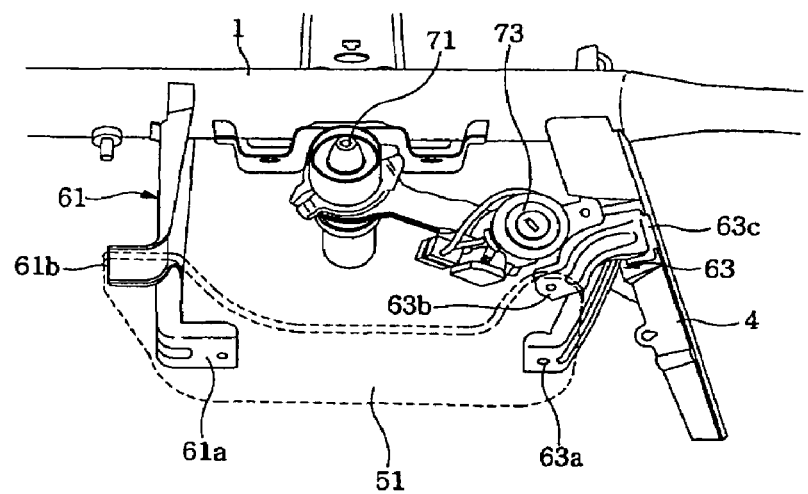

Referring to FIGS. 1c and 1d, the first and second knee bolster bracket members 61 and 63 according to the present invention are slantingly coupled to the cowl cross bar 1 and the center support bracket 4, respectively. In addition, predetermined portions of the upper and lower knee contact portions 61a, 61b, 63a and 63b of the fist and second knee bolster bracket members 61 and 63 are bent at a predetermined angle.

That is, as shown in FIG. 1c, the first knee bolster bracket member 61, the lower end of which is coupled to the cowl cross bar 1, is inclined in the left direction with respect to a vertical plane of the cowl cross bar 1. In addition, the second knee bolster bracket member 63 is also inclined in the left direction with respect to the vertical plane of the cowl cross bar 1.

FIG. 1d is a perspective plan view illustrating the first knee bolster bracket member 61 coupled to the cowl cross bar I of the vehicle chassis and the second knee bolster bracket member 63 coupled to the center support bracket 4 connected to the cowl cross bar 1.

Hereinafter, an operation of the knee bolster bracket structure according to the present invention will be described in relation to the vehicle crash.

Figure 2A:
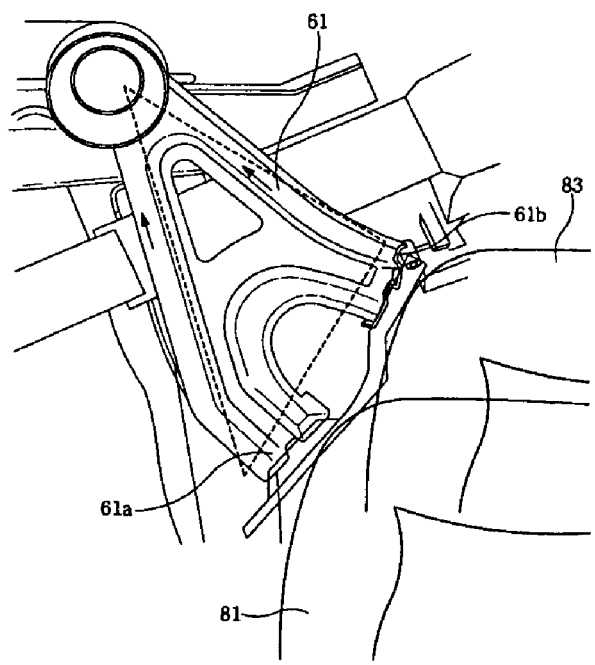
FIG. 2a is a perspective view illustrating knees of a driver colliding with a knee bolster bracket structure according to one embodiment of the present invention.

Referring to FIG. 2a, the first knee bolster bracket member 61 according to the present invention is positioned at a left side of the knee bolster bracket structure 60 and has a triangular plate shape in such a manner that the first knee bolster bracket member 61 can be used corresponding to position variation of knees 81 and 83 of the driver. That is, as shown in FIG. 2a, in a case of a 5% female dummy having a relatively small knee spacing used in the vehicle crash test, the knee 81 makes contact with a lower knee contact portion 61a of the first knee bolster bracket member 61. In addition, in a case of a 50% male dummy having a relatively large knee spacing used in the vehicle crash test, the knee 83 makes contact with the upper knee contact portion 61b of the first knee bolster bracket member 61 so that knee-load is applied in the direction of arrows shown in FIG. 3a. Accordingly, the first knee bolster bracket member 61 according to the present invention has a structure, which can be used corresponding to position variation of knees 81 and 83 of the driver.

Figure 2B:
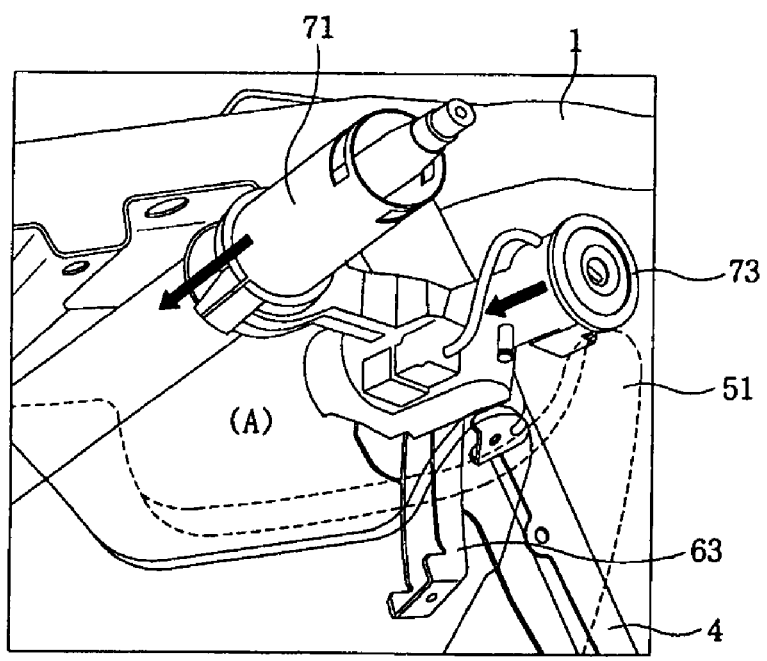
FIG. 2b is a perspective view illustrating a steering wheel, which has been compressed by colliding with a driver when a vehicular accident occurs.

Referring to FIG. 2b, the lower end of the second bolster bracket member 63 is welded to the center support bracket 4 so that the second bolster bracket member 63 does not interfere with the key set 73 when the key set 73 is compressed.

That is, if the key set 73 is compressed together with the steering wheel column 71 in the direction of an arrow shown in FIG. 2b due to a vehicle crash, since a rear space (A) is an empty space due to the above-mentioned arrangement of the second bolster bracket member 63 being coupled to the center support bracket 4 the second bolster bracket member 63 may not interfere with the key set 73 when the vehicular accident occurs.

Figure 2C:
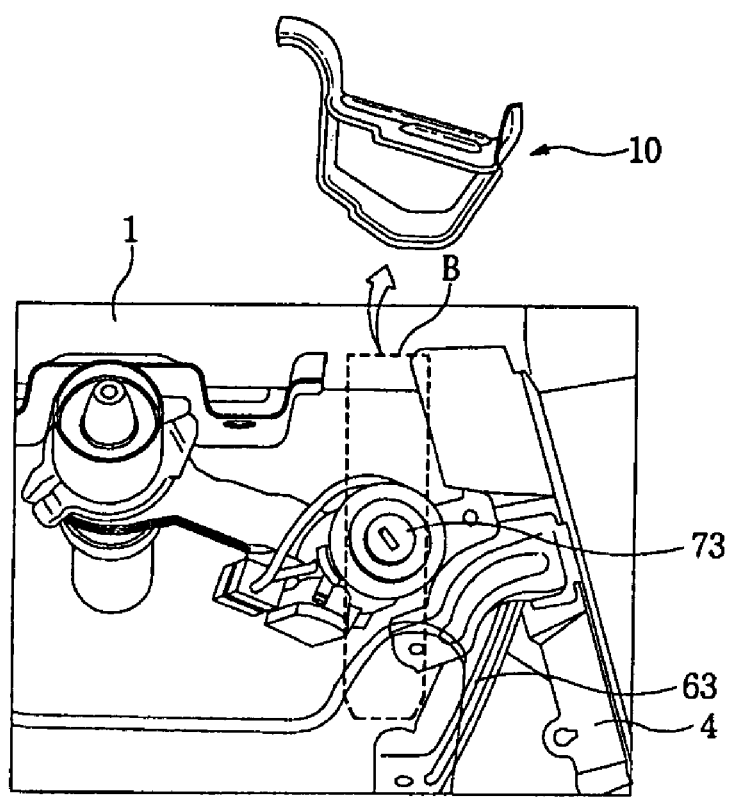
FIG. 2c is a perspective view illustrating installation positions of a conventional knee bolster bracket member and a knee bolster bracket member according to one embodiment of the present invention.

In this regard, further reference is made to FIG. 2c. FIG. 2c is a perspective view illustrating a comparison of installation positions of the conventional knee bolster bracket member 10 with the second knee bolster bracket member 63 configured according to one embodiment of the present invention.

As shown in FIG. 2c, the lower end of the conventional knee bolster bracket member 10 having a U-shape is coupled to the cowl cross bar 1. A dotted section (B) shown in FIG. 3c represents the installation position of the conventional knee bolster bracket member 10. In this case, when the key set 73 is compressed due to the vehicle crash, the compression direction of the key set 73 may interfere with the conventional knee bolster bracket member 10. However, according to the present invention, since the lower end of the second knee bolster bracket member 63 is coupled to the center support bracket, the second knee bolster bracket member 63 may not interfere with the key set 73.

Figure 3A:
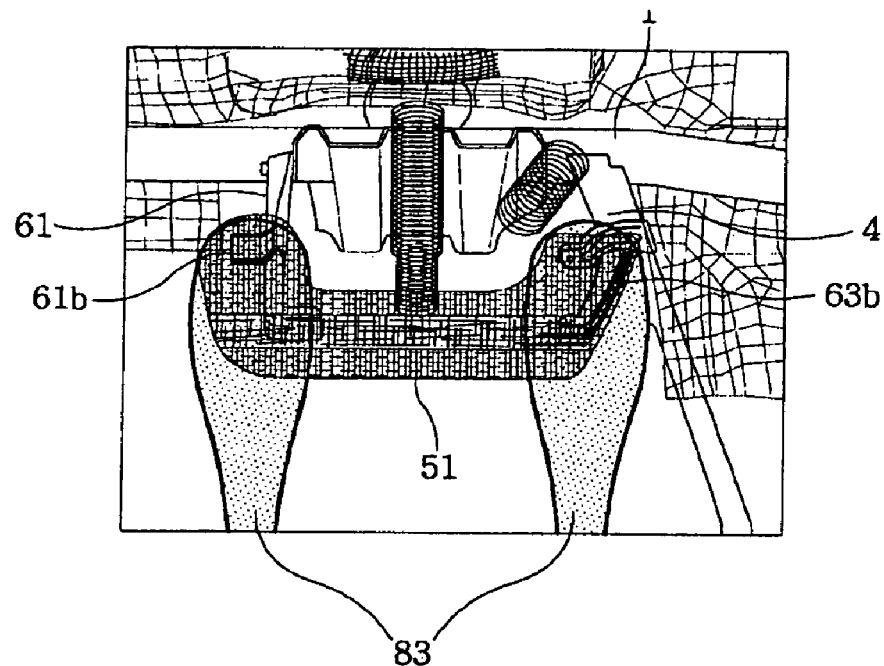
FIGS. 3a and 3b are CAE analysis views illustrating knees of a driver colliding with a knee bolster bracket member when a vehicle crash test is performed.
Figure 3B:
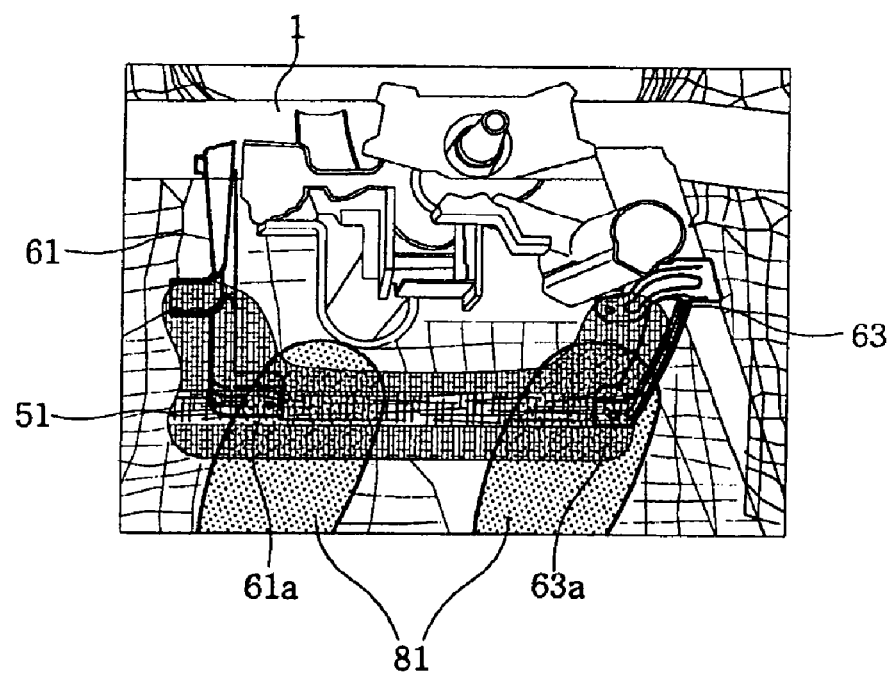
Figure 4A:
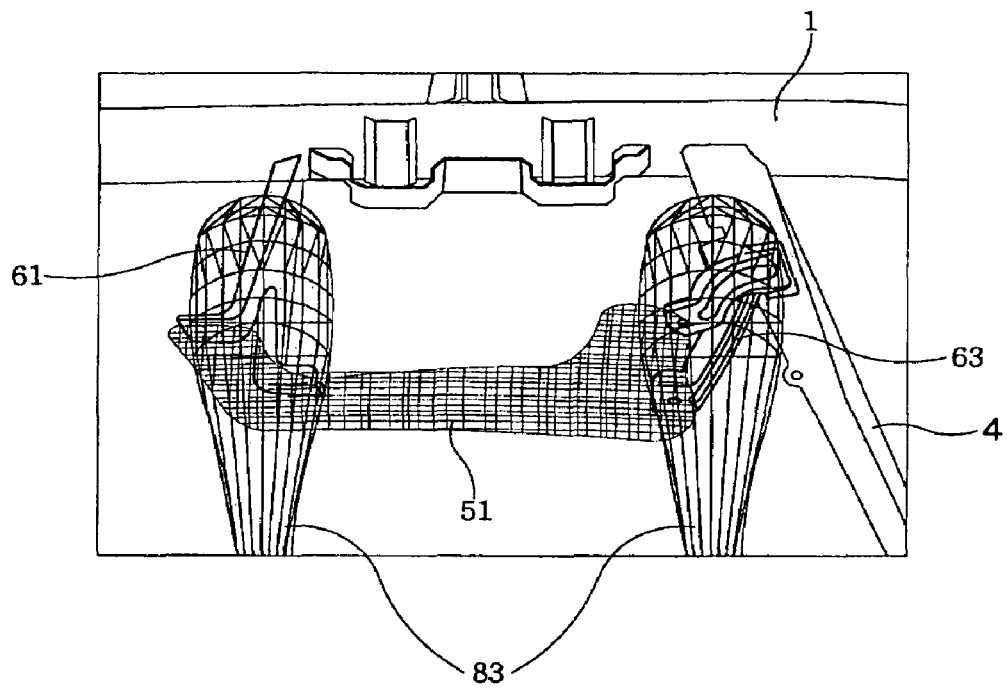
FIG. 4a is a CAE analysis view illustrating knee bolster bracket members according to an embodiment of the present invention, in which the knee bolster brackets are deformed without interfering with a key set being compressed.
Figure 4B:
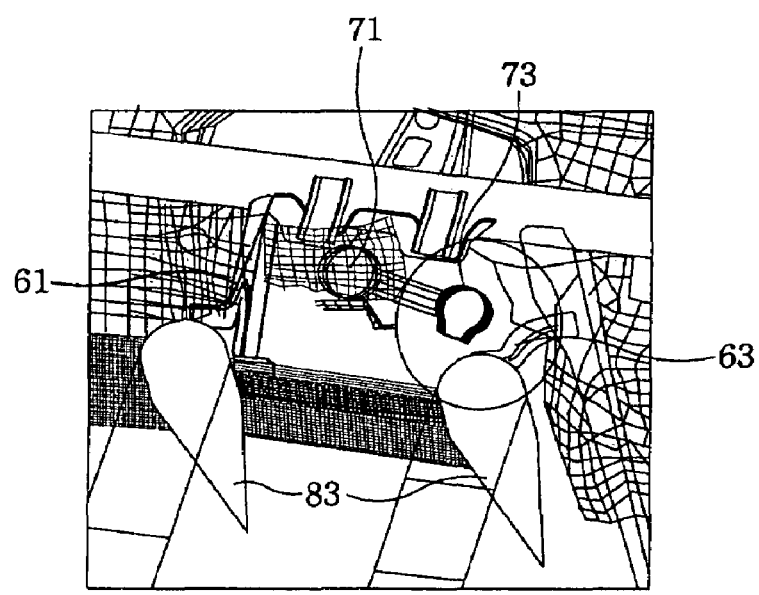
FIG. 4b is a CAE analysis view illustrating knees of a driver supported by knee bolster bracket members when a vehicle crash test is performed.

FIGS. 3a and 3b are CAE (Cad Aided Engineering) analysis views illustrating knees of the driver colliding with the knee bolster bracket member when a vehicle crash test is performed, wherein FIG. 4a shows the knees of the 50% male dummy colliding with the upper knee contact portions 61b and 63b of the first and second knee bolster bracket members 61 and 63 and FIG. 4b shows the knees of the 5% female dummy colliding with the lower knee contact portions 61a and 63a of the first and second knee bolster bracket members 61 and 63.

FIGS. 3a and 3b show vehicle states just before the deformation caused by the vehicle crash starts. Reference numeral 51 represents the lower panel positioned in front of the knees of the driver.

As mentioned above, the first and second knee bolster bracket members 61 and 63 according to the present invention may form the bracket structure, which can be used corresponding to position variation of the knee of the driver, so that the knee bolster bracket structure of the present invention can stably support the knees of the driver even though there is a height difference between male's knee and female's knee.

FIG. 4a is a CAE analysis view illustrating knee bolster bracket members 61 and 63 according to one embodiment of the present invention, in which the knee bolster bracket members 61 and 63 are deformed without interfering with the key set being compressed, and FIG. 4b is a CAE analysis view illustrating knees of the driver supported by the knee bolster bracket members 61 and 63 when the vehicle crash test is performed.

As can be seen from FIG. 4a, when the vehicular accident occurs, the knees of the driver may collide with the lower and upper knee contact portions 61a, 63a, 61b and 63b of the first and second bolster bracket members 61 and 63. In addition, the key set 73 and the steering wheel column 71 are compressed downward because the chest of the driver collides with the key set 73 and the steering wheel column 71. At this time, the second bolster bracket member 63 of the present invention may not interfere with the key set 73 and the steering wheel column 71 being compressed, so that the key set 73 and the steering wheel column 71 can be smoothly compressed. In addition, the knees of the driver colliding with the second bolster bracket member 63 may be continuously supported by means of the second bolster bracket member 63, so the knees of the driver can be prevented from being seriously damaged.

According to the conventional knee bolster structure, the knee bolster bracket member 10 may interfere with the key set 73 when the vehicular accident occurs due to the structural problem thereof, so the key set 73 cannot be normally compressed, causing serious damage to the knees of the driver.

Referring to FIG. 4b, when the vehicular accident occurs, the knees 81 and 83 of the driver may collide with the lower and upper knee contact portions 61a, 63a, 61b and 63b of the fist and second bolster bracket members 61 and 63. The first and second bolster bracket members 61 and 63 may slantingly move in the left direction, so that the knees of the driver can be moved together with the first and second bolster bracket members 61 and 63 even if the knees excessively moves forwards. Thus, the fit and second bolster bracket members 61 and 63 are deformed while moving together with the knees of the driver, so that the first and second bolster bracket members 61 and 63 can continuously support the knees 81 and 83 of the driver.

As described above, the knee bolster structure for the vehicle according to present invention has two bracket members having triangular shapes, in which the lower end of the first knee bolster bracket member is coupled to the cowl cross bar and the lower end of the second knee bolster bracket member is coupled to the center support bracket connected to the cowl cross bar. Accordingly, the knee bolster structure of the present invention can be used corresponding to position variation of knees of the driver. In addition, when the key set is compressed due to the vehicular accident, the knee bolster bracket member does not interfere with the key set being compressed. According to the present invention, the knee bolster bracket members are slantingly coupled to the cowl cross bar and the center support bracket, respectively, so the knee bolster bracket members may be slantingly bent while continuously supporting the knees of the driver and absorbing impact energy, thereby preventing the knees of the driver from being seriously damaged.

Although a preferred embodiment of the present invention has been described for illustrative purposes, those skilled in the art will appreciate that various modifications, additions and substitutions are possible, without departing from the scope and spirit of the invention as disclosed in the accompanying claims.

What is claimed is:

1. A knee bolster structure for a vehicle, the knee bolster structure comprising:
    a first knee bolster bracket member installed at an inner portion of a lower panel disposed at a location corresponding to a front lower portion of a driver in order to absorb impact applied thereto from knees of the driver and positioned at a side of a fuse box; and
    a second knee bolster bracket member for being positioned adjacent to a key set integrally formed with a steering wheel column of the vehicle, wherein
    the first knee bolster bracket member has a substantially triangular plate shape including a vertex portion for being coupled to a cowl cross bar of the vehicle and two lateral parts configured to extend towards the knee location of the driver, upper and lower knee contact portions being formed at front end portions of the two lateral parts while being spaced from each other in a longitudinal direction, and
    the second knee bolster bracket member includes a lower end portion for being coupled to a center support bracket connected to the cowl cross bar, and two lateral parts configured to extend towards the knee location of the driver, upper and lower knee contact portions being formed at front end portions of the two lateral parts while being spaced from each other in a longitudinal direction.

2. The knee bolster structure as claimed in claim 1, wherein the first and second knee bolster bracket members are configured to be inclined at an angle with respect to a vertical plane of the cowl cross bar of the vehicle.

3. The knee bolster structure as claimed in claim 2, wherein predetermined front parts of the upper knee contact portion and the lower knee contact portion of the first knee bolster bracket member or the second knee bolster bracket member are bent in opposition to each other.

4. The knee bolster structure as claimed in claim 1, wherein the second knee bolster bracket member is configured to be coupled to the center support bracket at an inclination.

5. The knee bolster structure as claimed in claim 1, wherein predetermined front parts of the upper knee contact portion and the lower knee contact portion of the first knee bolster bracket member or the second knee bolster bracket member are bent in opposition to each other.

* * * * *